(12) United States Patent
Rick

(10) Patent No.: US 6,787,037 B2
(45) Date of Patent: Sep. 7, 2004

(54) PROCESS FOR TREATING INDUSTRIAL WASTEWATERS

(75) Inventor: Manfred Rick, Lohmar, DE (US)

(73) Assignee: Ford Global Technologies, LLC, Dearborn, MI (US)

(*) Notice: Subject to any disclaimer, the term of this patent is extended or adjusted under 35 U.S.C. 154(b) by 66 days.

(21) Appl. No.: 10/248,589

(22) Filed: Jan. 30, 2003

(65) Prior Publication Data

US 2003/0155308 A1 Aug. 21, 2003

(30) Foreign Application Priority Data

Jan. 31, 2002 (EP) .......................................... 02100091

(51) Int. Cl.⁷ ................................................. C02F 3/00
(52) U.S. Cl. ...................................................... 210/631
(58) Field of Search ........................................ 210/631

(56) References Cited

U.S. PATENT DOCUMENTS 5,362,395 A 11/1994 Dorau et al.
6,355,175 B1 * 3/2002 Green et al. ................ 210/652

\* cited by examiner

*Primary Examiner*—Chester T. Barry
(74) *Attorney, Agent, or Firm*—Raymond L. Coppiellie

(57) ABSTRACT

The invention relates to a process for treating industrial wastewaters, preferably wastewaters from the metal-processing industry, preferably suitable for treating the wastewater in such a manner that it can be recycled back to the production. In the process the wastewater passes through a sequence of treatment steps consisting of a chemical/physical flocculation/precipitation, a filter system, a biological wastewater purification stage and also a nanofiltration unit.

3 Claims, 1 Drawing Sheet

PROCESS FOR TREATING INDUSTRIAL WASTEWATERS

BACKGROUND OF THE INVENTION

1. Field of the Invention

The invention relates to a process for treating industrial wastewaters, in particular wastewaters from the metal-processing industry, preferably suitable for treating the wastewater in such a manner that it can be recycled back to the production.

2. Description of the Related Art

In the metal processing industry, frequently large amounts of wastewaters are produced, for example from the cutting or polishing of workpieces, in the form of cutting fluids or as cooling water or flushing water. Customarily, this wastewater is released after it is passed through an appropriate wastewater treatment plant (WTP). Multiple use or reuse of the wastewater in production is desirable for reasons of costs.

The abovementioned wastewaters are essentially polluted with the following pollutants (the basis used here is the German Wastewater Framework Administrative Provisions, Annex 40):
[t1]

TABLE 1

[Pollutants in industrial wastewater and their methods of treatment]

| Parameter | Method of treatment in the WTP |
| --- | --- |
| Heavy metals | Flocculation/precipitation as metal hydroxide sludge, bisulfide precipitation, ion exchanger. |
| Chlorinated hydrocarbons, volatile halogenated hydrocarbons | Activated carbon |
| Complexing agents | Avoidance |
| Hydrocarbons | Membrane methods |
| COD | Biodegradation stage |

These pollutants are currently dealt with using appropriate chemical or physical processes, as shown in the abovementioned table, and removed. It is necessary to comply here with the legally established concentrations. In particular, flocculation and/or precipitation of the pollutants plays a central role in the treatment process, since large amounts of water can only be treated using these processes. However, as a byproduct of the precipitation process, the water becomes salted with calcium compounds, sodium compounds, chloride compounds and sulfate compounds.

DE 37 09 174 discloses a process which describes cleaning up organically polluted wastewater. In the process the organic pollutants are microbiologically converted under superatmospheric pressure and the resultant biological sludge is separated from the wastewater by membrane filtration or ultrafiltration. However, this process has the disadvantage that poorly biodegradable organic pollutants or inorganic pollutants which are of a particle size below the membrane separation limit are not converted or are not removed, but remain in the wastewater.

EP 0 503 115, building on DE 37 09 174, describes a process in which not only the organic biodegradable pollutants, but also the poorly biodegradable or non-biodegradable organic pollutants and inorganic pollutants are removed from the wastewater. In this process the poorly biodegradable or non-biodegradable organic matter is physically and/or chemically treated so that it can be fed to a biological treatment. In addition, in particular the pollutants are concentrated and thus passed repeatedly through the biological purification. This concentration is carried out by membrane filtration, preferably nanofiltration, with nanofiltration having the advantage that only low-molecular-weight dissolved consistuents, especially salts, remain in the wastewater thus treated. However, this process also has the disadvantage that the treated wastewater is not further used, but released into the sewage system.

DE 38 15 271 discloses a process in which, before or after the biological purification stage, at least one of the following processes is carried out: adsorption, membrane filtration and/or oxidation. However, this process also has the disadvantage that the treated wastewater is not further used.

A process for repeated utilization of wastewaters is finally disclosed by DE. In this case, additional quality criteria for reuse of the wastewater in production are specified:
[t2]

TABLE 2

[Quality features with target values in the treated wastewater]

| Parameter | Target values |
| --- | --- |
| COD | <100 mg |
| CaO | <50 mg |
| Conductivity | <1000 mS/cm |

After passing through a suitable WTP, the wastewater is first passed through a sand filter. The wastewater then passes through a fixed-bed reactor for COD breakdown. The Ca ions are then exchanged for Na ions in two water-softening columns operating alternately. The final nanofiltration then serves to set all quality parameters of the wastewater which is then thus purified. It must be ajudged here a disadvantage that in this process a relatively large amount of wastewater is produced and an additional wastewater stream is produced by the water-softening system.

SUMMARY OF INVENTION

Against this background, it is an object of the present invention to develop a process which continuously treats industrial wastewaters in such a manner that they are again available for production and the disadvantages of the above described processes are avoided.

This object is achieved by a process for treating industrial wastewaters by the method of the present invention. According to the present invention, the wastewater, preferably wastewater from the metal processing- industry, is first pretreated by a flocculation or precipitation process for removing the heavy metals from the wastewater. The flocculation aids used are customarily metal salts or combination products. The flocculation aids are added in a neutral to acid environment. The mixture is then neutralized using an aqueous alkali solution, preferably sodium hydroxide solution, milk of lime or the like being used. The resultant flocks are removed using a suitable separator, for example a tilted-plate clarifier. Depending on the type of the metal-processing operation, a subsequent oil separator or coalescence separator may be required, which then removes the free oil from the wastewater stream. Via a suitable filter system, for example a sand filter, to remove residual flocks and/or suspended matter, the wastewater then passes to a biological purification stage. This biological purification stage is generally constructed as trickling filter or fixed-bed reactor. The biological purification stage serves for decreasing the chemical oxygen demand (COD). Preferably, the biological purification stage is supported by injecting oxygen. Downstream of the biological purification stage, a fine filter can be connected which protects the nanofiltration membrane from carbon abrasion from the biological purification stage. To stabilize the temperature, a heat exchanger can be integrated which increases or decreases the temperature as required. Finally, the wastewater is fed into a single-stage or multistage nanofiltration system. Filter system, biological purification stage and nanofiltration system are backwashed as required in a known manner.

BRIEF DESCRIPTION OF DRAWINGS

The invention will be described in more detail with reference to the illustrative embodiment shown in the accompanying drawing. In the drawing

DETAILED DESCRIPTION

Figure 1:
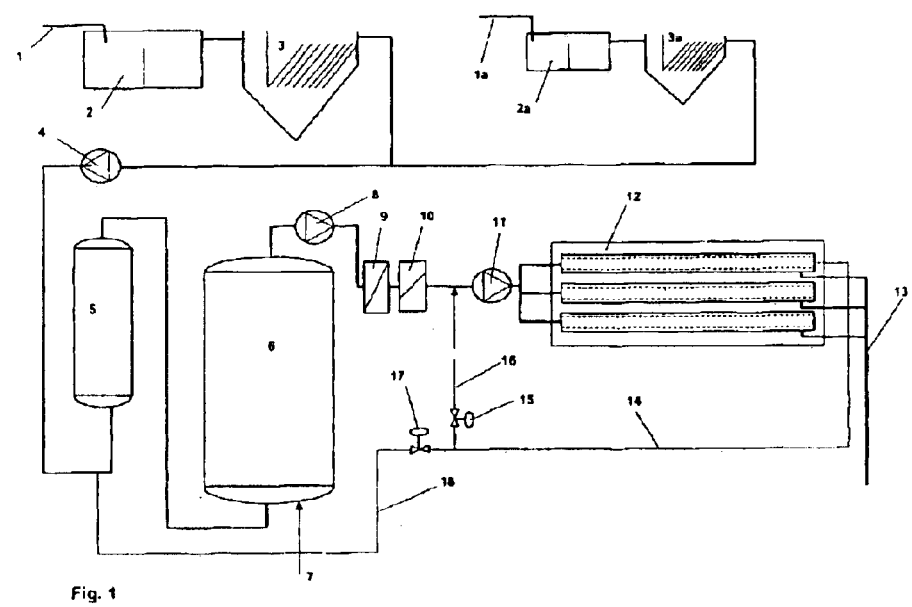
FIG. 1 shows a diagrammatic sketch of a preferred embodiment of the inventive water purification plant

FIG. 1 shows a diagrammatic drawing of the inventive wastewater purification plant. The wastewater from production reaches the inventive wastewater purification plant via one or more wastewater lines 1, 1a. The wastewater is first subjected to a flocculation or precipitation process 2, 2a to remove the heavy metals from the wastewater. The resulting flocks are removed in a suitable separator 3, 3a, for example a tilted-plate clarifier (shown here). The wastewater stream thus pretreated then passes via a pump station 4 to a filter system 5. The filter system 5 serves for removing residual flocks from the flocculation/precipitation 2, 2a. In the subsequent biofilter 6, the COD is reduced, the biofilter 6 preferably being constructed as a trickling filter or fixed-bed reactor. For support, oxygen 7 is additionally injected into the biofilter 6. The feed pump 8 further conveys the wastewater stream thus treated via a fine filter 9, to protect the nanofiltration membrane 12 from carbon abrasion, a heat exchanger 10, to stabilize the temperature, to the nanofiltration system 12. In this case the upstream bleed pump 11 ensures the necessary constant pressure in the nanofiltration system 12. The purified wastewater 13, advantageously approximately one tenth of the total wastewater stream, leaves the nanofiltration system 12 and can thus be recirculated back to the production. The remaining wastewater is fed via a line 14 according to the invention back to the purification stage or stages 5, 6, 12. In this embodiment, the recirculation proceeds either via valve 15 and line 16 back to the nanofiltration 12, or via valve 17 and line 18 back to the filter 5.

In an advantageous embodiment of the present invention, the portion of the wastewater stream remaining after the nanofiltration passes again through the nanofiltration. The ratio of wastewater stream which again passes through the nanofiltration to the purified water is to be planned as required here. A ratio of 10 parts of wastewater stream to 1 part of purified water has proven to be advantageous. Recirculation to the nanofiltration has the advantage here that the nanofiltration membrane can be selected to be very fine, since the wastewater stream passes through the membrane several times. In addition, the pollutants are concentrated in the nanofiltration circuit. In addition, it is advantageous to carry out the nanofiltration circuit as a feed and bleed method. The bleed pump here ensures a pressure which is maintained for the nanofiltration, while the feed pump is adjusted so that the amount of purified wastewater is replaced by feeding wastewater from the biofilter and thus ensures that the liquid rate is maintained for the nanofiltration. As previously, again, a fine filter and a heat exchanger can be integrated into the feed of the wastewater to the nanofiltration. In this arrangement also, the individual components are regularly backwashed.

In a further advantageous embodiment of the invention, the non-purified wastewater stream remaining after the nanofiltration is fed back to the biological purification stage for renewed treatment. This has the advantage that the COD is reduced continuously and variations in pollutant content are compensated for. In addition, the nanofiltration also concentrates here the pollutants which are in part degraded in the biological purification stage, as already mentioned above. The wastewater, in this arrangement also, is preferably fed in a feed and bleed method via a fine filter and a heat exchanger to the nanofiltration. All filters require, as above, regular backwashing.

In a further preferred embodiment of the invention the wastewater stream, after passing through the nanofiltration, is fed back into the biological purification stage via a filter system and further passed, as described above, preferably via a fine filter and a heat exchanger to the nanofiltration. The advantage compared with the abovementioned embodiment in this case is the possibility of additionally flocculating out suspended matter before the wastewater stream is passed into the biofilter. Here, the filters are backwashed in a known manner.

What is claimed is:

1. A process for treating industrial wastewaters, preferably for wastewaters from a metal-processing system, comprising the steps of:

passing wastewater through at least one chemical/physical flocculation/precipitation process, a filter system, a biological wastewater purification stage and also a nanofiltration unit to Form a wastewater mixture;

neutralizing the wastewater mixture by adding an aqueous alkali solution to the wastewater mixture;

passing the wastewater mixture through a separator to remove resulting flocks; removing free oil from the wastewater mixture by passing the mixture through an oil separator;

passing the wastewater mixture through a biological filtration stage for decreasing the chemical oxygen demand of the wastewater mixture;

feeding back the wastewater mixture for additional nanofiltration after the wastewater mixture has been passed through the nanofiltration a first time; and returning the wastewater mixture to the metal processing system for reuse therein.

2. The process for treating industrial wastewaters as claimed in claim 1, wherein the wastewater mixture, after passing through the nanofiltration, is fed back to the biological purification stage for renewed treatment.

3. The process for treating industrial wastewaters as claimed in claim 1, wherein the wastewater mixture, after passing through the nanofiltration, is fed back into the biological purification stage via a filter system.

* * * * *